US010984184B2

(12) United States Patent
Natarajan

(10) Patent No.: US 10,984,184 B2
(45) Date of Patent: Apr. 20, 2021

(54) MAINTENANCE OF A METAFILE USING SPREADSHEET SOFTWARE

(71) Applicant: Change Healthcare Holdings, LLC, Nashville, TN (US)

(72) Inventor: Balasubramanian Natarajan, Nashville, TN (US)

(73) Assignee: CHANGE HEALTHCARE HOLDINGS, LLC, Nashville, TN (US)

(*) Notice: Subject to any disclaimer, the term of this patent is extended or adjusted under 35 U.S.C. 154(b) by 56 days.

(21) Appl. No.: 16/216,504

(22) Filed: Dec. 11, 2018

(65) Prior Publication Data

US 2020/0184008 A1 Jun. 11, 2020

(51) Int. Cl.
*G06F 40/18* (2020.01)
*G06F 16/11* (2019.01)
*G06F 40/14* (2020.01)
*G06F 40/151* (2020.01)
*G06F 40/205* (2020.01)
*G06F 40/114* (2020.01)

(52) U.S. Cl.
CPC ............ G06F 40/18 (2020.01); G06F 16/116 (2019.01); G06F 40/114 (2020.01); G06F 40/14 (2020.01); G06F 40/151 (2020.01); G06F 40/205 (2020.01)

(58) Field of Classification Search
CPC ..................................................... G06F 40/18
See application file for complete search history.

(56) References Cited

U.S. PATENT DOCUMENTS

| | | | | |
|---|---|---|---|---|
| 6,990,632 B2* | 1/2006 | Rothchiller | ............. | G06F 16/84 715/212 |
| 7,003,722 B2* | 2/2006 | Rothchiller | ............. | G06F 40/14 715/212 |
| 7,007,033 B1* | 2/2006 | Rothschiller | ........... | G06F 40/18 |
| 7,017,112 B2* | 3/2006 | Collie | ................... | G06F 40/131 715/212 |
| 7,096,422 B2* | 8/2006 | Rothschiller | ......... | G06F 40/154 715/212 |
| 7,249,316 B2* | 7/2007 | Collie | ................... | G06F 40/131 715/209 |
| 7,373,600 B2* | 5/2008 | Lee | ....................... | G06F 16/258 715/239 |
| 7,421,646 B1* | 9/2008 | Leung | .................... | G06F 40/14 715/212 |
| 7,500,185 B2* | 3/2009 | Hu | ......................... | G16H 15/00 715/235 |
| 7,958,100 B2* | 6/2011 | Judd | ..................... | G06F 16/258 707/705 |
| 8,200,505 B2* | 6/2012 | Walker | .................. | G06Q 10/00 705/2 |

(Continued)

OTHER PUBLICATIONS

Archie, K. A., & Marcus, D. S. (2012). DicomBrowser: software for viewing and modifying DICOM metadata. Journal of digital imaging, 25(5), 635-645. https://doi.org/10.1007/s10278-012-9462-x (Year: 2012).*

Primary Examiner — Scott T Baderman
Assistant Examiner — Benjamin Smith
(74) Attorney, Agent, or Firm — Meunier Carlin & Curfman LLC

(57) ABSTRACT

Disclosed and described herein are systems, methods and computer program products that enable converting a metafile to a spreadsheet file, editing the spreadsheet file, and then transforming the spreadsheet file back to an output metafile.

36 Claims, 10 Drawing Sheets

(56) References Cited

U.S. PATENT DOCUMENTS

| | | | | |
|---|---|---|---|---|
| 8,468,244 B2* | 6/2013 | Redlich | G06Q 10/107 | 709/225 |
| 8,850,057 B2* | 9/2014 | Natoli | G06F 16/258 | 709/232 |
| 9,961,156 B2* | 5/2018 | Natoli | G06F 16/258 | |
| 10,192,031 B1* | 1/2019 | Walker | G06F 40/154 | |
| 10,540,153 B2* | 1/2020 | Stachura | G06F 8/34 | |
| 2004/0172590 A1* | 9/2004 | Rothschiller | G06F 40/166 | 715/212 |
| 2004/0172591 A1* | 9/2004 | Rothschiller | G06F 16/84 | 715/212 |
| 2004/0172592 A1* | 9/2004 | Collie | G06F 40/131 | 715/212 |
| 2004/0172616 A1* | 9/2004 | Rothschiller | G06F 40/14 | 717/114 |
| 2005/0246629 A1* | 11/2005 | Hu | G06F 40/154 | 715/237 |
| 2006/0004844 A1* | 1/2006 | Rothschiller | G06F 40/14 | |
| 2006/0090129 A1* | 4/2006 | Collie | G06F 40/131 | 715/209 |
| 2006/0101333 A1* | 5/2006 | Collie | G06F 40/131 | 715/209 |
| 2007/0022128 A1* | 1/2007 | Rothschiller | G06F 40/18 | |
| 2007/0150809 A1* | 6/2007 | Yoshida | G06F 40/154 | 715/235 |
| 2008/0222517 A1* | 9/2008 | Halim | G06F 40/154 | 715/236 |
| 2009/0080408 A1* | 3/2009 | Natoli | H04L 49/35 | 370/351 |
| 2009/0254572 A1* | 10/2009 | Redlich | G06Q 10/06 | |
| 2010/0250497 A1* | 9/2010 | Redlich | H04L 63/0227 | 707/661 |
| 2014/0006342 A1* | 1/2014 | Love | G06F 16/23 | 707/609 |
| 2014/0330573 A1* | 11/2014 | Romatoski | G06F 16/242 | 705/2 |
| 2014/0330855 A1* | 11/2014 | Atanasiu | G06F 16/242 | 707/759 |
| 2015/0006612 A1* | 1/2015 | Natoli | H04L 67/12 | 709/202 |
| 2018/0157468 A1* | 6/2018 | Stachura | G06F 8/34 | |
| 2018/0241834 A1* | 8/2018 | Natoli | H04L 67/2823 | |

\* cited by examiner

```
<system>
    <PhysicianMaintenanceInfo Version="8.1.0.0">
        <Physicians>
            ...
            <Physician ID="{999XXXXX-X9XX-9999-9X99-99XX9X9999}" ...>
                <Physician ID="{...}" ...>
                    <LOB ID="{999-99999-9999}" ... </LOB>
                    <LOB ID="{999-99999-9999}" ... </LOB>
                    ...
                </Physician>
            ...
        </Physicians>
        ...
    </PhysicianMaintenanceInfo>
</system>
```

FIG. 2B

| Meta file | XSD file |
|---|---|
| `<continents>`<br>    `<continent name="North America">`<br>        `<countries>`<br>            `<country name="USA"`<br>            `population="300M">`<br>                `<state code="TX"`<br>                `name="Texas"`<br>                `population="10M"/>`<br>            ...<br>            `</country>`<br>            ...<br>        `</countries>`<br>    `</continent>`<br>...<br>`</continents>` | `<xs:element name="continents">`<br>`<xs:complexType>`<br>`<xs:sequence>`<br>`<xs:element name="continent">`<br>`<xs:complexType>`<br>`<xs:sequence>`<br>`<xs:element name="countries">`<br>`<xs:complexType>`<br>`<xs:sequence>`<br>`<xs:element name="country">`<br>`<xs:complexType>`<br>`<xs:sequence>`<br>`<xs:element name="state">`<br>`<xs:complexType>`<br>`<xs:attribute name="code" type="xs:string" use="required" />`<br>`<xs:attribute name="name" type="xs:string" use="required" />`<br>`<xs:attribute name="population" type="xs:string" use="required" />`<br>`</xs:complexType>`<br>`</xs:element>`<br>`</xs:sequence>`<br>`<xs:attribute name="name" type="xs:string" use="required" />`<br>`<xs:attribute name="population" type="xs:string" use="required" />`<br>`</xs:complexType>`<br>`</xs:element>`<br>`</xs:sequence>`<br>`</xs:complexType>`<br>`</xs:element>`<br>`</xs:sequence>`<br>`<xs:attribute name="name" type="xs:string" use="required" />`<br>`</xs:complexType>`<br>`</xs:element>`<br>`</xs:sequence>`<br>`</xs:complexType>`<br>`</xs:element>` |

FIG. 2C

```
<system>
  <PhysicianMaintenanceInfo Version="8.1.0.0">
    <Physicians>
      <Physician ID="{999X9X9XX-X9XX-9999-9XX9-99XXX9X99999}" ...>
        <Physician ID="{...}" ...>
          <LOB ID="{999-99999-9999}"... PhysicianID="{9999X9XX-999}"</LOB>
          <LOB ID="{999-99999-9999}"... PhysicianID="{9999X9XX-999}"</LOB>
        </Physician>
        ;
      </Physicians>
    </PhysicianMaintenanceInfo>
</system>
```

| ZipCode | TelephoneNo | TaxId |
|---|---|---|
| 753910437 | 2143457086 | 752771 |
| 70458 | 5046498561 | 726014 |

| SuppressCCIBP | SuppressMNAI | SuppressMNBI | SuppressMNBP | PhysicianID |
|---|---|---|---|---|
| N | N | N | N | {953FD1B7-E9B8-4083-9E40-92CA0E5287A5} |
| N | N | N | N | {953FD1B7-E9B8-4083-9E40-92CA0E5287A5} |
| N | N | N | N | {6B314677-E41B-42EC-ACA2-9B4FA81FDF8D} |
| N | N | N | N | {6B314677-E41B-42EC-ACA2-9B4FA81FDF8D} |
| N | N | N | N | {88566A77-439C-41CE-A8BE-9033606D0FC0} |
| N | N | N | N | {88566A77-439C-41CE-A8BE-9033606D0FC0} |
| N | N | N | N | {88566A77-439C-41CE-A8BE-9033606D0FC0} |
| N | N | N | N | {88566A77-439C-41CE-A8BE-9033606D0FC0} |
| N | N | N | N | {88566A77-439C-41CE-A8BE-9033606D0FC0} |
| N | N | N | N | {88566A77-439C-41CE-A8BE-9033606D0FC0} |
| N | N | N | N | {88566A77-439C-41CE-A8BE-9033606D0FC0} |
| N | N | N | N | {88566A77-439C-41CE-A8BE-9033606D0FC0} |
| N | N | N | N | {88566A77-439C-41CE-A8BE-9033606D0FC0} |
| N | N | N | N | {69F00E08-E9EE-4454-A68F-C4608CAC3FA3} |
| N | N | N | N | {69F00E08-E9EE-4454-A68F-C4608CAC3FA3} |

From 2F (A)

FIG. 2F(B)

MAINTENANCE OF A METAFILE USING SPREADSHEET SOFTWARE

FIELD OF THE INVENTION

Embodiments of the present invention relate to improved methods, systems and computer program products for maintaining metafile data using conventional spreadsheet software.

BACKGROUND

Metafile is a generic term for a file format that can store multiple types of data. This commonly includes graphics file formats. These graphics files can contain raster, vector, and type data. A common use for these files is to provide support for an operating system's computer graphics; e.g., Microsoft Windows uses Windows Metafile, and Mac OS X uses PDF. A file format like .IEF (Image Exchange Format) is a standard way that graphical/image information is encoded for storage in a computer file.

Imaging continues to grow as a way to capture, store and manipulate information. For example, digital imaging and communications in medicine (DICOM) was raised with the development of medical imaging informatics. It creates a public and license-free standard method for the transmission of digital medical images and their associated information. Currently, DICOM has been widely adopted by hospitals since it enables the integration of scanners, servers, workstations, printers, and network hardware from multiple manufacturers into a picture archiving and communication system (PACS). In the DICOM Standard, there are many separate parts, and each part of the standard concentrates on a different point of view of the DICOM protocol.

The DICOM Standard facilitates interoperability of medical imaging equipment by specifying: (1) For network communications, a set of protocols to be followed by devices claiming conformance to the Standard. (2) The syntax and semantics of Commands and associated information that can be exchanged using these protocols. (3) For media communication, a set of media storage services to be followed by devices claiming conformance to the Standard, as well as a File Format and a medical directory structure to facilitate access to the images and related information stored on interchange media. (4) Information that must be supplied with an implementation for which conformance to the Standard is claimed. The DICOM Standard does not specify: (1) The implementation details of any features of the Standard on a device claiming conformance. (2) The overall set of features and functions to be expected from a system implemented by integrating a group of devices each claiming DICOM conformance. (3) A testing/validation procedure to assess an implementation's conformance to the Standard.

As noted herein, the DICOM Standard pertains to the field of Medical Informatics. Within that field, it addresses the exchange of digital information between medical imaging equipment and other systems. Because such equipment may interoperate with other medical devices and information systems, the scope of this Standard needs to overlap with other areas of medical informatics. However, the DICOM Standard does not address the breadth of this field.

This Standard has been developed with an emphasis on diagnostic medical imaging as practiced in radiology, cardiology, pathology, dentistry, ophthalmology and related disciplines, and image-based therapies such as interventional radiology, radiotherapy and surgery. However, it is also applicable to a wide range of image and non-image related information exchanged in clinical, research, veterinary, and other medical environments. This Standard facilitates interoperability of systems claiming conformance in a multi-vendor environment, but does not, by itself, guarantee interoperability. For example, there are various DICOM standards including DICOM JSON Format, DICOM Native Model (XML), DICOMweb™, and other standards.

While the use of image information continues to proliferate, it is not easily edited or managed in its native image format. For example, while an XML file may be imported into a spreadsheet program, formatting and relationships of the XML file may not be preserved in the spreadsheet format. Likewise, while most spreadsheet programs allow exporting a file in an XML format, a spreadsheet having multiple sheets may not be exported into a single XML file while preserving the relationships between the sheets. Furthermore, it may be desired to verify data that has been converted from an image format, imported into a spreadsheet program, edited, and exported back into an image format file.

Therefore, methods, systems and computer program products are desired that overcome challenges in the art, some of which are described herein

BRIEF SUMMARY

Disclosed and described herein are systems, methods and computer program products for editing of data that comprises a metafile. In one aspect, the method comprises selecting, by a processor of a computing device comprised of at least the processor and a memory, a first file comprised of data in a metafile. In some instances, the first file in the metafile format is comprised of multiple pages. In some instances, the first file in the metafile format is in an image exchange format (IEF) that is comprised of nested XML data. Generally, the first file is stored in the memory accessible by the processor of the computing device. Relationships among the data in the metafile are identified. The data in the metafile is transformed into data in a spreadsheet format by the processor of the computing device. The data is imported into multiple sheets of a spreadsheet workbook based on the identified relationships. Edits to the data in the spreadsheet format are received using the processor of the computing device. The edited data is then transformed, by the processor of the computing device, back to a file comprised of data in an output metafile. Generally, the transformed data may be saved in multiple sheets of the spreadsheet file.

Optionally or alternatively, the metafile is comprised of data in an image exchange format (IEF) file. For example, the IEF file may comprise a digital imaging and communications in medicine (DICOM) protocol.

Generally, the method of selecting the data in the metafile comprises the steps of generating, by the processor of the computing device, one or more folders in the memory for parsing the metafile; generating, by the processor of the computing device, an intermediate metafile; parsing, by the processor of the computing device, the intermediate metafile into one or more new metafiles and storing the one or more new metafiles in one of the one or more new folders. The method of identifying relationships among the data in the metafile may further comprise identifying relationships, by the processor of the computing device, between nodes of the intermediate metafile and storing the identified relationships in one or more new schema files in one of the one or more new folders, wherein each of the one or more new schema files corresponds to one of the one or more new metafiles, and populating the one or more new schema files with business rules; and building, by the processor of the computing device, an import map in one of the one or more folders, wherein the import map maps relationships between the one or more new metafiles and corresponding sheets of the spreadsheet for each of the one or more new metafiles. The method may further comprise generating, by the processor of the computing device, the spreadsheet workbook; and importing, by the processor of the computing device, data from each of the one or more new metafiles into the spreadsheet, wherein each of the one or more new metafiles is imported into a separate sheet of the spreadsheet, wherein the data from each of the one or more new metafiles is in the spreadsheet format after being imported into the spreadsheet.

Optionally or alternatively, the method may further comprise creating a schema file for the intermediate metafile and each of the one or more schema files comprise a parent child relationship map, wherein the parent child relationship map identifies relationships between parent-child nodes.

Optionally or alternatively, the method may comprise validating the data in the metafile is validated against data in one or more schema files used to create the metafile by the processor of the computing device.

Optionally or alternatively, the method may further comprise transforming, by the processor of the computing device, multiple sheets of the spreadsheet workbook into a single output metafile. In some instances, the single output metafile may comprise a single IEF file.

Optionally or alternatively, the multiple sheets of the spreadsheet workbook are transformed by the computing device into a nested output metafile. For example, the nested output metafile may comprise a nested IEF file.

Also disclosed herein is a non-transitory computer-readable medium comprised of computer-executable instructions that when executed by a computing device perform a method of editing of data as described above.

A system for editing of data that comprises a metafile is also disclosed. In one aspect, the system comprises a computing device comprised of at least a processor and a memory in communication with the processor. The processor executes computer-executable code for selecting, by the processor of a computing device, a first file comprised of data in a metafile. In some instances, the first file in the metafile format is comprised of multiple pages. In some instances, the first file in the metafile format is in an image exchange format (IEF) that is comprised of nested XML data. Generally, the first file is stored in the memory accessible by the processor of the computing device. Relationships among the data in the metafile are identified by the processor of the computing device. The data in the metafile is transformed into data in a spreadsheet format by the processor of the computing device. The data is imported into multiple sheets of a spreadsheet workbook based on the identified relationships. Edits to the data in the spreadsheet format are received using the processor of the computing device. The edited data is then transformed, by the processor of the computing device, back to a file comprised of data in an output metafile.

Optionally or alternatively, the metafile is comprised of data in an image exchange format (IEF) file. For example, the IEF file may comprise a digital imaging and communications in medicine (DICOM) protocol.

Generally, selecting the data in the metafile comprises the steps of generating, by the processor of the computing device, one or more folders in the memory for parsing the metafile; generating, by the processor of the computing device, an intermediate metafile; parsing, by the processor of the computing device, the intermediate metafile into one or more new metafiles and storing the one or more new metafiles in one of the one or more new folders. Identifying relationships among the data in the metafile may further comprise identifying relationships, by the processor of the computing device, between nodes of the intermediate metafile and storing the identified relationships in one or more new schema files in one of the one or more new folders, wherein each of the one or more new schema files corresponds to one of the one or more new metafiles, and populating the one or more new schema files with business rules; and building, by the processor of the computing device, an import map in one of the one or more folders, wherein the import map maps relationships between the one or more new metafiles and corresponding sheets of the spreadsheet for each of the one or more new metafiles. The processor of the computing device generates the spreadsheet workbook and imports the data from each of the one or more new metafiles into the spreadsheet, wherein each of the one or more new metafiles is imported into a separate sheet of the spreadsheet, wherein the data from each of the one or more new metafiles is in the spreadsheet format after being imported into the spreadsheet.

Optionally or alternatively, a schema file for the intermediate metafile may be created by the processor of the computing device and each of the one or more schema files comprise a parent child relationship map, wherein the parent child relationship map identifies relationships between parent-child nodes.

Optionally or alternatively, the data in the metafile may be validated against data in one or more schema files used to create the metafile by the processor of the computing device.

Optionally or alternatively, multiple sheets of the spreadsheet workbook may be transformed, by the processor of the computing device, into a single output metafile. In some instances, the single output metafile may comprise a single IEF file.

Optionally or alternatively, the multiple sheets of the spreadsheet workbook may be transformed by the computing device into a nested output metafile. For example, the nested output metafile may comprise a nested IEF file.

Other objects and advantages will become apparent to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of this application.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 2B is an illustration of a format of exemplary physician data in a metafile.

FIG. 2C illustrates an example of an input metafile named "continents.xml" and its corresponding schema file (e.g., an XSD file).

FIG. 2E is an exemplary illustration of the original metafile shown in FIG. 2B re-formatted as the intermediate metafile.

FIG. 2F(A) and FIG. 2F(B) are an illustration of exemplary sheets of a spreadsheet created from the data shown in the intermediate metadata file of FIG. 2E.

DETAILED DESCRIPTION

Figure 1:
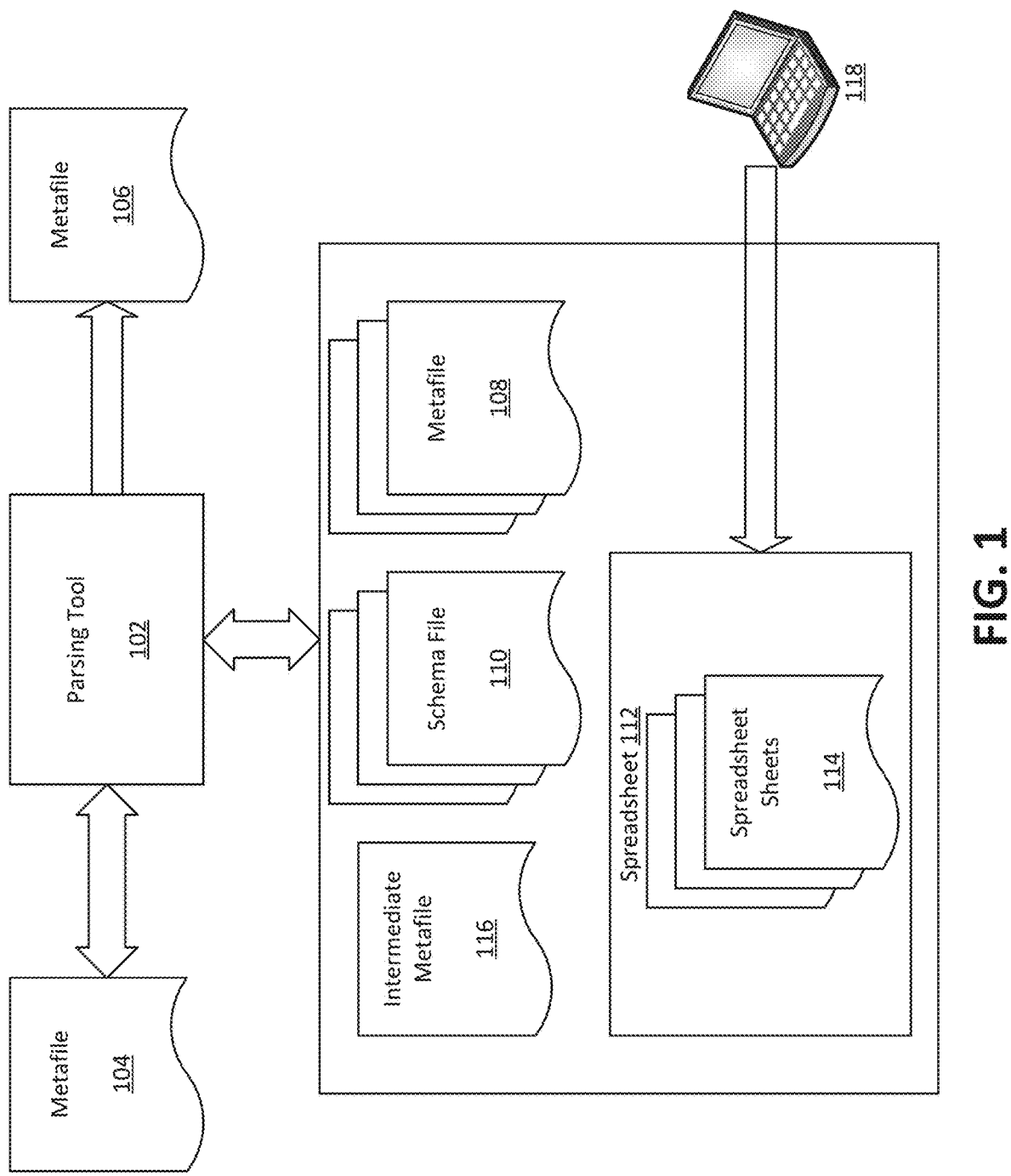
FIG. 1 is an overview diagram of systems, methods and computer program products for editing of data that comprises a metafile.

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes¬from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present methods and systems may be understood more readily by reference to the following detailed description of preferred embodiments and the Examples included therein and to the Figures and their previous and following description.

A. Overview

As shown in the overview diagram of FIG. 1, one aspect comprises systems, methods and computer program products for editing of data that comprises a metafile. In FIG. 1, a parsing tool 102 accesses data in a metafile 104. The parsing tool 102 comprises computer-executable code that is executed by a computing device (as further described herein). The computing device comprises at least a processor and a memory. The metafile 104 is stored in the memory of the computing device, or in a memory that is accessible by the computing device. The metafile 104 comprises data stored in an image format. For example, the metafile 104 may be comprised of data in an image exchange format (IEF) file. The information parsed from the metafile 104 by the parsing tool 102 is used to create one or more new metafiles 108 and one or more schema files 110. The one or more new metafiles 108 and the one or more schema files 110 are stored in the memory of the computing device or in a memory that is accessible by the computing device. The one or more new metafiles 108 and the one or more schema files 110 are used by the processor of the computing device to generate a spreadsheet 112. The spreadsheet 112 may be comprised of one or more sheets 114. Relationships among data in the metafile 104 are preserved in the spreadsheet 112 by use of the one or more schema files 110. Optionally, the one or more schema files 110 may also contain business rules. Data in the one or more new metafiles 108 can be validated against the business rules in the one or more schema files as it is being imported into the spreadsheet 112.

Once the spreadsheet 112 is created, edits are received to the data in the spreadsheet. Data in the spreadsheet 112 may be edited by a person/user 118 using the processor of the computing device and the software that comprises the spreadsheet program. Editing may involve adding new data, deleting data, changing data, etc. Once edited, the edited data is transformed by the processor of the computing device back into data that comprises an output metafile 106. Optionally, the data may be validated against the business rules while in the spreadsheet format, or as it is being transformed back into data that comprises an output metafile 106. The data is validated against the business rules before it is converted to the output metafile 106. For example, during editing in the spreadsheet format, when the user enters a state code as a single character by typo <state code="T" capital="Austin". . ./>, the business rule is that "State code 'T' is not a valid state code" (e.g., it must be "TX") and the data is not validated. An error is displayed to the user, and the user can correct the error by editing the data in the spreadsheet format.

In some instances, the parsing tool 102 is a "plug-in" that can be added to an existing software application such as Microsoft® Excel (Microsoft Corporation, Redmond, Wash.) spreadsheet software, or can be called from a separate software application by, for example, an API call, as known to one of ordinary skill.

B. Detailed Description

Figure 2A:
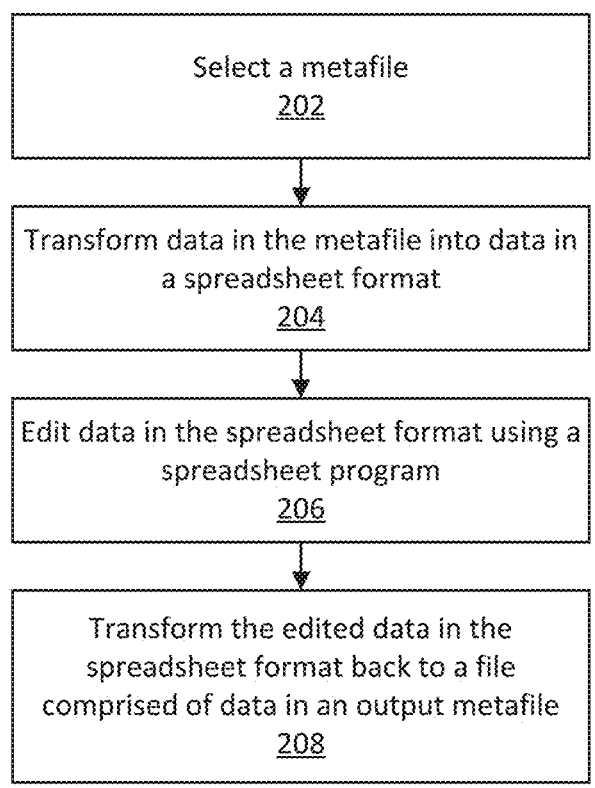
FIG. 2A is a flowchart that illustrates one method of editing data that comprises a metafile.

FIG. 2A is a flowchart that describes one method of editing data that comprises a metafile. At 202, a file comprised of data in a metafile is selected by a processor of a computing device, the computing device comprising at least the processor and a memory. The file is comprised of data in a metafile and is stored in the memory or in a memory that is accessible by the processor of the computing device. For example, FIG. 2B is an illustration of a format of exemplary physician data in a metafile. As can be seen in FIG. 2B, the physician data is comprised of a list of lists, (i.e., denormalized data), and mapped element's having relationships with other elements that cannot be preserved if imported directly into a spreadsheet file. In some instances, the metafile is comprised of data in an image exchange format (IEF) file. For example, the file comprised of data in the IEF may comprise a file in conformance with a standard protocol such as a digital imaging and communications in medicine (DICOM) protocol. In various instances, the DICOM protocol comprises one of DICOM JSON format, DICOM Native Model (XML) format, DICOMweb™ format, and the like. Similar to FIG. 2B, FIG. 2C illustrates an example of an input metafile named "continents.xml" and its corresponding schema file (e.g., XSD file).

Figure 2D:
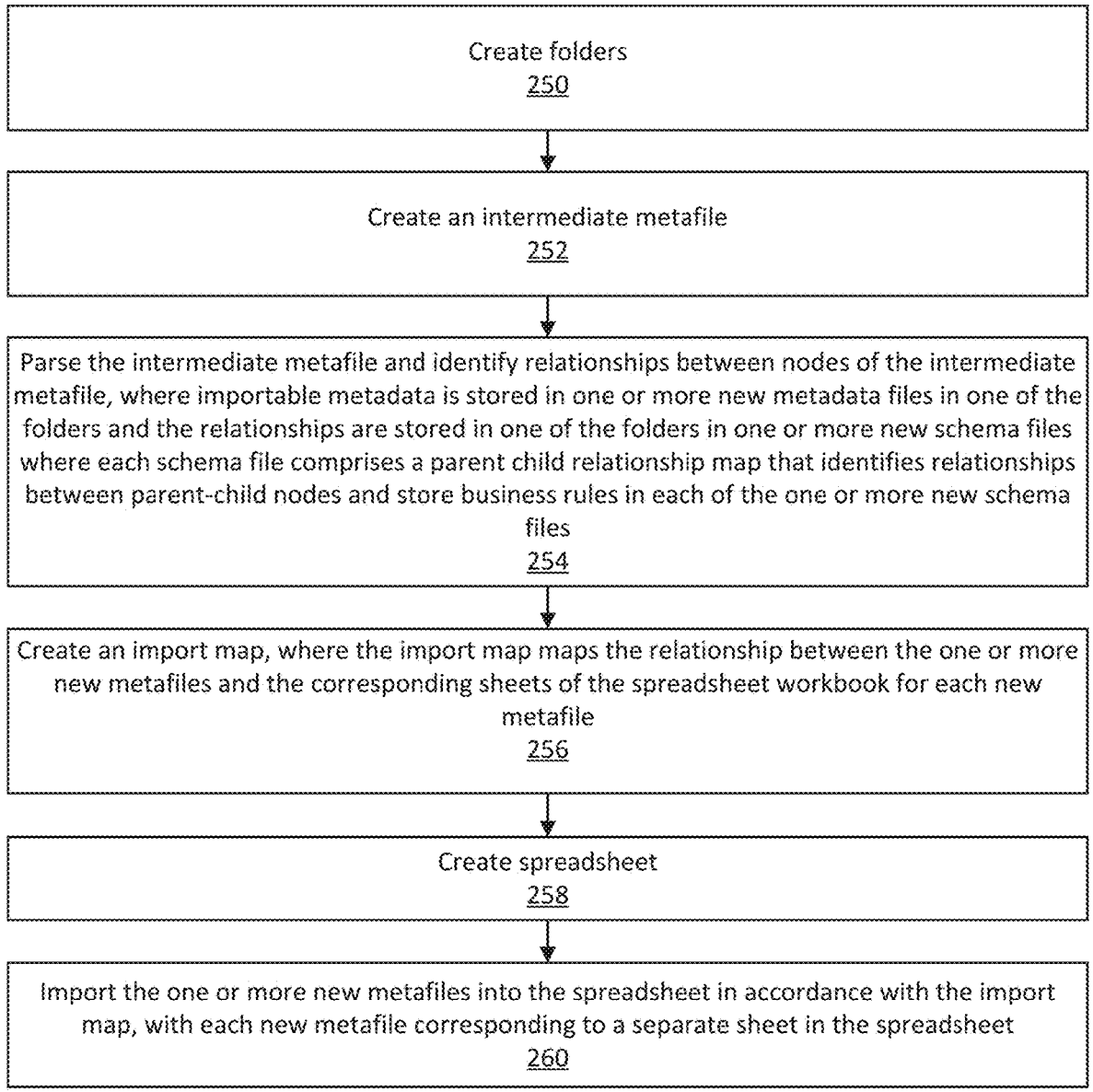
FIG. 2D is a flowchart illustrating one exemplary process for transforming the data in the metafile into data in a spreadsheet format.

At 204, the data in the metafile is transformed by the processor of the computing device into data in a spreadsheet format. FIG. 2D is a flowchart illustrating one exemplary process for transforming the data in the metafile into data in a spreadsheet format. At step 250 of FIG. 2D, the parsing tool 102 creates, using a processor of the computing device, one or more folders in the memory for parsing the metafile. For example, the parsing tool 102 may create two folders named XML and XSD, where the XML folder is created for storing importable metadata files and the XSD folder is created for storing relationships between elements that comprise the data in the metafile and also for storing validation rules for the data. At step 252, the parsing tool 102, using the processor of the computing device, creates an intermediate metafile 116. In some instances, the intermediate metafile 116 is stored in a temporary folder in the memory of the computing device or in some instances it may be stored in one of the one or more folders. The intermediate metafile 116 is a copy of the original metafile but may have different relationship formatting than the original metafile. For example, the original metafile shown in FIG. 2B may be re-formatted as the intermediate metafile 116 as shown in FIG. 2E. The intermediate metafile 116 shown in FIG. 2E includes a list of physicians with physicians' attributes and a list of lines of business (LOB's) with LOB's attribute plus a new attribute for relating the LOB with a physician using a physician ID. At step 254, the processor of the computing device parses the intermediate metafile 116 into one or more new metafiles and identifies relationships between nodes of the intermediate metafile 116. A corresponding schema file is created for each of the one or more new metafiles and the schema file identifies the relationships between nodes identified in the corresponding new metafile. In some instances, the schema file may be populated with business rules by the parsing tool 102 at the time the schema file is created. Also, a schema file may be created for the intermediate metafile. The one or more new metafiles are created by the processor of the computing device in one of the one or more folders based on the identified relationships between nodes of the intermediate metafile, and the one or more schema files are created in one of the one or more folders where each schema file comprises a parent child relationship map, wherein the parent child relationship map identifies relationships between parent-child nodes. For example, below "facility" metafile has one line of business ("lob") assigned to it:

In this example case, "facility" is a parent and "lob" is a child. These rules are specified in the schema definition. In some instances, the one or more new metafiles comprise XML files and the one or more schema files comprise XSD files. In some instances, the one or more new metafiles are stored in the XML folder (described above) and the one or more new schema files are stored in the XSD folder (also described above).

When parsing the intermediate metafile 116, the parsing tool 102 uses the processor of the computing device to split the metadata in the intermediate metafile 116 into multiple chunks and check for issues that may affect the importation of that data into a spreadsheet. If any issues are found that would affect importation, the parsing tool 102 continues to split the metadata that comprises the intermediate metafile 116 until it finds data that can successfully be imported to the spreadsheet. For example, Microsoft Excel spreadsheet does not allow denormalized, list of lists metadata to be imported. An error is created when such files are attempted to be imported into the spreadsheet. Parsing of the intermediate metafile continues until a root node of the parent-child relationships of the data that comprises the intermediate metafile is reached. The parsing tool 102 parses the un-importable data and creates the one or more metafiles comprised of metadata that is importable to spreadsheet.

An example of the parsing tool 102 splitting the metadata into importable metadata files is shown below. When trying to open a metafile called "continents.xml" using the parsing tool, the one or more new metafiles named, for example, "continent.xml," "countries.xml," and "states.xml." This makes the metadata in the continent.xml, countries.xml and states.xml metafiles importable. Each of the new one or more XML files appears (after importing) in the spreadsheet as a single page.

For example, here is exemplary metadata for an input metafile called "continents.xml":

```
<continents>
    <continent name="North America">
        <countries>
            <country name="USA" population="300M">
                <state code="TX" name="Texas" population="10M"/>
                ...
            </country>
            ...
        </countries>
    </continent>
    ...
</continents>
```

The metadata of the "continents.xml" file is split into one or more new metafiles for example, "continent.xml," "countries.xml," and "states.xml." The metafile "continent.xml" contains:

```
<continents>
    <continent name="North America" />
    <continent name="Asia"/>
    <continent name="Europe"/>
</continents>
```

The new metafile "countries.xml" contains the following metadata after splitting:

```
<countries>
    <country name="USA", population="300M"/>
    <country name="Canada", population="180M"/>
    ...
</countries>
```

The new metafile "states.xml" contains the following metadata after splitting:

```
<states>
    <state code="TX" name="Texas" population="10M"/>
    ...
</states>
```

Split logic maintains the relationship between worksheet files as well as the content received from the input file. In the above case, the one or more schema files maintain the relationships that existed in the intermediate metafile 116 so that the "continent.xml" files knows its countries and the "countries.xml" file knows its states and so on.

For each of the generated one or more schema files, the parsing tool 102 performs business rule validations. For example, an exemplary business rule may be that the acceptable range values for a Spatiality Code ID is a 001-099, 301-308, N01-N07, C01-009 value required if the payer is NEIC. Other than this, any other value stored or entered will cause a validation error. Other business rules may be associated with the name a user will use to log on to a product. For examples, the username may have a minimum length of five characters and the username can include any letters or numbers, where usage of special characters is limited to the dash, underscore, and period. Another example of a business rule is that the client's account policy expiration interval minus the difference between the last password changed/created date and today cannot exceed a defined number (e.g., 90) of days. Each rule is validated for the corresponding fields before getting too far into the importation process.

Figure 2F:
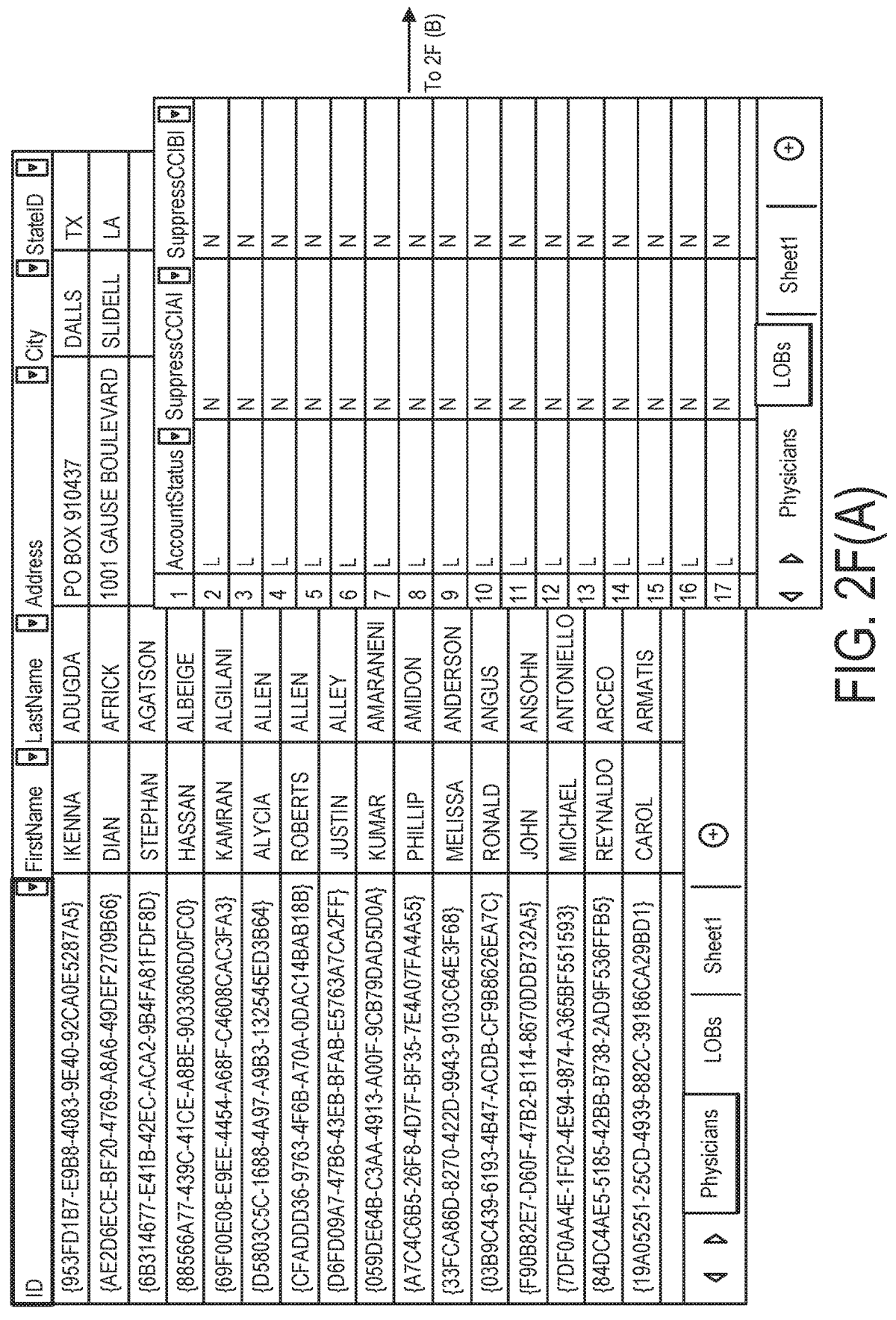

At 256, the parsing tool 102 causes an import map to be built by the processor of the computing device. The import map maps the relationship between the one or more new metafiles and the corresponding sheets of the spreadsheet workbook for each new metafile. Generally, the import map is kept in the random-access memory (RAM) of the computing device, though in some instances it may be stored in a file on an accessible long-term memory device. For example, the import file may be saved in a temporary file. At 258, the parsing tool 102 causes the processor to create a spreadsheet workbook. The spreadsheet workbook has a separate sheet for each of the new one or more metafiles created by the parsing tool 102. At 260, the one or more new metafiles are imported into the spreadsheet workbook in accordance with the import map, with each new metafile corresponding to a separate sheet in the spreadsheet workbook. FIG. 2F(A) and FIG. 2F(B) are an illustration of exemplary sheets of a spreadsheet workbook created from the data shown in the intermediate metadata file 116 of FIG. 2E. In some instances, the spreadsheet format comprises a Microsoft® Excel spreadsheet format.

Returning to FIG. 2A, at 206 the data in the spreadsheet format is edited using the processor of the computing device using a conventional spread sheet software application (e.g., Microsoft® Excel). Using the example material shown in FIGS. 2B and 2E, a user is allowed to make changes to the spreadsheet data, for example a user is able to add/delete/update the Facility or its LOBs. The relationship is maintained using the Parent ID column. When the user creates a new facility or LOB they can define the Parent ID column based on the Facility or Physician or the Group. In some instances, the created spreadsheet file is saved in the memory accessible by the computing device. For example, the spreadsheet file may be saved in the memory before the spreadsheet file is edited and/or the spreadsheet file may be saved in the memory after the spreadsheet file is edited.

Figure 2G:
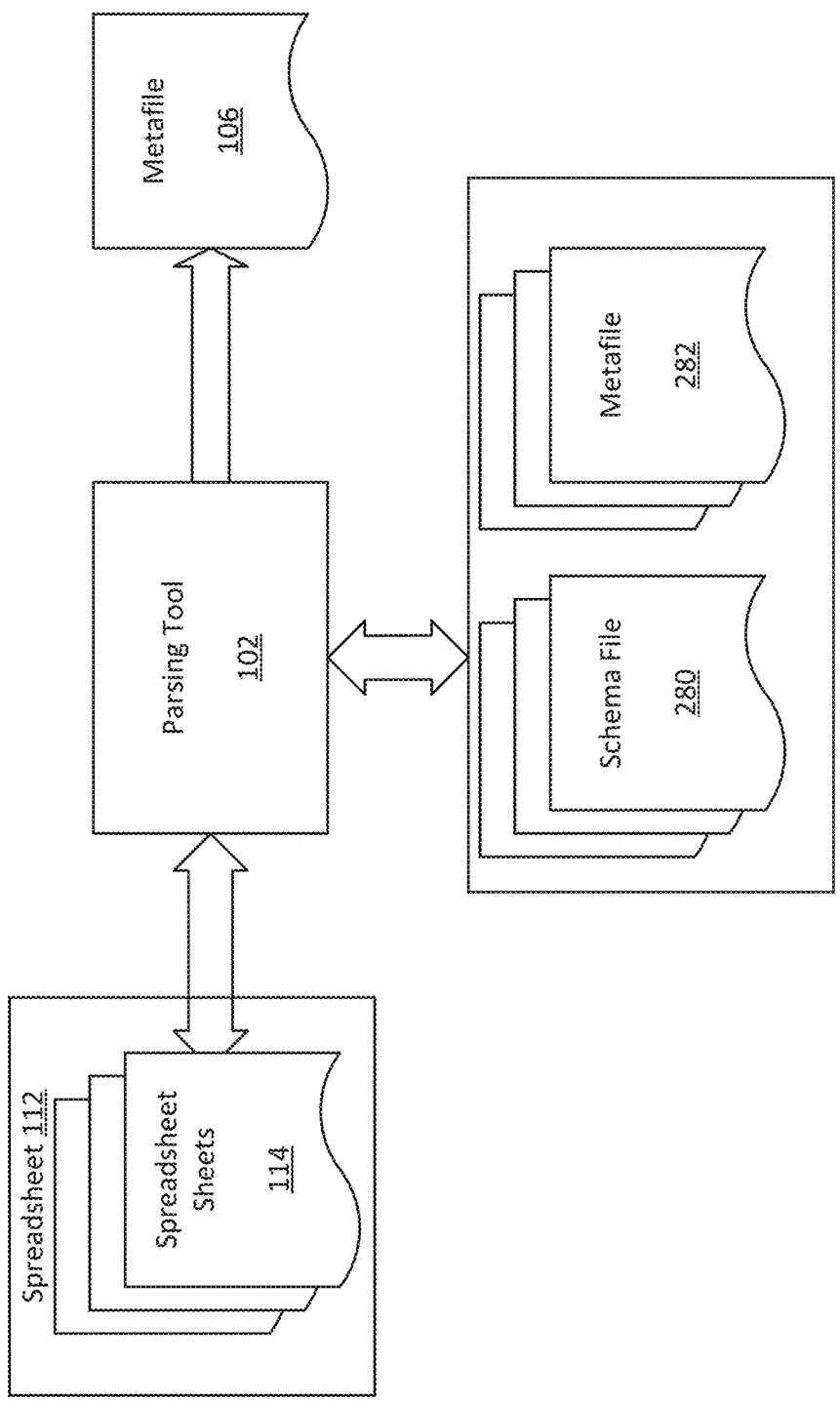
FIG. 2G illustrates the process of transforming the edited data in the spreadsheet format back to a file comprised of data in the metafile.

At 208, the processor of the computing device transforms the edited data in the spreadsheet format back to a file comprised of data in an output metafile. In some instances, the transformed data existed as multiple sheets of the spreadsheet file or workbook and the multiple sheets of the spreadsheet file may be transformed by the processor of the computing device into a single output metafile 106. FIG. 2G illustrates the process of transforming the edited data in the spreadsheet format back to a file comprised of data in the metafile. As shown in FIG. 2G, the parsing tool 102 accesses the one or more sheets 114 of the edited spreadsheet workbook 112. The information in the one or more sheets 114 is parsed to one or more metafiles 282 using the one or more schema files 280 created during the import process described herein. In some instances, the one or more metafiles 280 comprise XML files and the one or more schema files comprise XSD files. The parsing tool 102 then uses the one or more metafiles 282 and one or more schema files 280 to create the single output metafile 106. For example, given the input metafile shown in FIG. 2C, the parsing tool 102 created separate sheets in the spreadsheet workbook for each of continents, countries, and states. Using the schema file of the intermediate metafile, the parsing tool knows the order for creating the single output metafile 106. For example, referring to FIG. 2C, the parsing tool 102 reads data in order from each of spreadsheet sheets continents, countries, and states, as determined from the schema file shown in FIG. 2C, to create the single output metafile 106 in the same order as the input metafile. In some instances, the single output metafile 106 comprises an image exchange format (IEF) file. In some instances, the IEF file may be in conformance with the DICOM protocol. For example, the IEF file may be in conformance with one of DICOM JSON format, DICOM Native Model (XML) format, DICOMweb™ format, and the like. In some instances, the multiple sheets of the spreadsheet file may be transformed by the processor of the computing device into a nested output metafile 106. In some instances, the nested output metafile 106 may comprise a nested IEF file and the IEF file may be in conformance with the DICOM protocol, and the DICOM protocol may comprise one of DICOM JSON format, DICOM Native Model (XML) format, DICOMweb™ format, and the like.

Optionally, the process of FIG. 2A may include validating the data in the output metafile 106. This is performed by the parsing tool 102 by comparing, by the processor of the computing device, the data in the output metafile 106 against data in the one or more schema files 282 that are used to create the output metafile 106. Any errors noted in the comparison are displayed to a user.

C. Computing Environment

Figure 3:
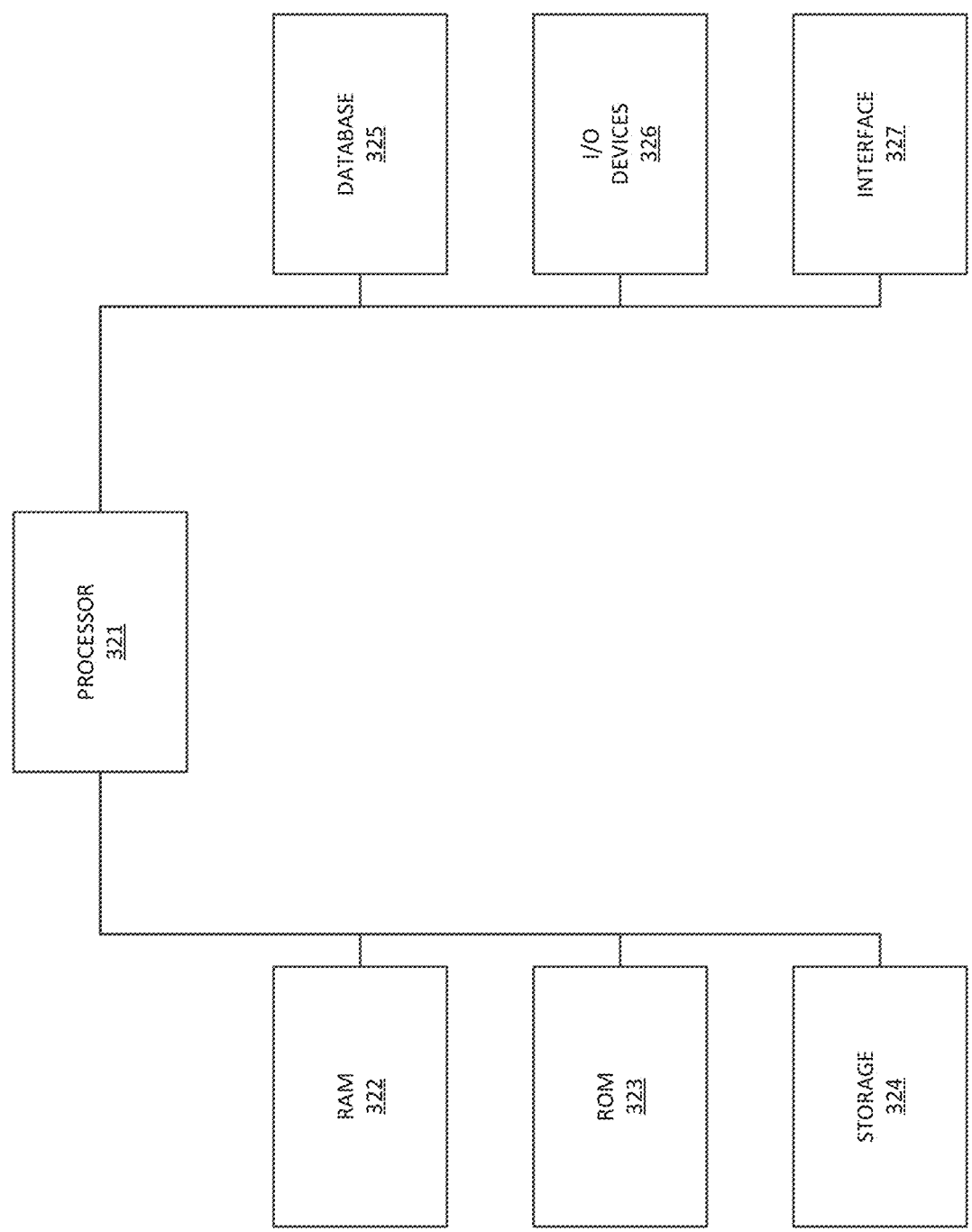
FIG. 3 illustrates an exemplary computer or computing device that may comprise all or a portion of aspects of embodiments of the invention.

FIG. 3 illustrates an exemplary computer or computing device that can be used for some or all of the features described herein. All or a portion of the device shown in FIG. 3 may comprise all or a portion of any of the components described herein that may include and/or require a processor or processing capabilities. As used herein, "computer" may include a plurality of computers. The computers may include one or more hardware components such as, for example, a processor 321, a random-access memory (RAM) module 322, a read-only memory (ROM) module 323, a storage 324, a database 325, one or more input/output (I/O) devices 326, and an interface 327. Alternatively, and/or additionally, the computer may include one or more software components such as, for example, a computer-readable medium including computer executable instructions for performing a method associated with the exemplary embodiments. It is contemplated that one or more of the hardware components listed above may be implemented using software. For example, storage 324 may include a software partition associated with one or more other hardware components. It is understood that the components listed above are exemplary only and not intended to be limiting.

Processor 321 may include one or more processors, each configured to execute instructions and process data to perform one or more functions associated with a computer for editing of data that comprises a metafile. Processor 321 may be communicatively coupled to RAM 322, ROM 323, storage 324, database 325, I/O devices 326, and interface 327. Processor 321 may be configured to execute sequences of computer program instructions to perform various processes. The computer program instructions may be loaded into RAM 322 for execution by processor 321.

RAM 322 and ROM 323 may each include one or more devices for storing information associated with operation of processor 321. For example, ROM 323 may include a memory device configured to access and store information associated with the computer, including information for identifying, initializing, and monitoring the operation of one or more components and subsystems. RAM 322 may include a memory device for storing data associated with one or more operations of processor 321. For example, ROM 323 may load instructions into RAM 322 for execution by processor 321.

Storage 324 may include any type of mass storage device configured to store information that processor 321 may need to perform processes corresponding with the disclosed embodiments. For example, storage 324 may include one or more magnetic and/or optical disk devices, such as hard drives, CD-ROMs, DVD-ROMs, or any other type of mass media device.

Database 325 may include one or more software and/or hardware components that cooperate to store, organize, sort, filter, and/or arrange data used by the computer and/or processor 321. For example, database 325 may store information and instructions related to editing of data that comprises a metafile. It is contemplated that database 325 may store additional and/or different information than that listed above.

I/O devices 326 may include one or more components configured to communicate information with a user associated with computer. For example, I/O devices may include a console with an integrated keyboard and mouse to allow a user to maintain a database of metadata, and the like. I/O devices 326 may also include a display including a graphical user interface (GUI) for outputting information on a monitor. FIGS. 4A-4D illustrate exemplary GUIs for the disclosed system and methods. I/O devices 326 may also include peripheral devices such as, for example, a printer for printing information associated with the computer, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 327 may include one or more components configured to transmit and receive data via a communication network, such as the Internet, a local area network, a workstation peer-to-peer network, a direct link network, a wireless network, or any other suitable communication platform. For example, interface 327 may include one or more modulators, demodulators, multiplexers, demultiplexers, network communication devices, wireless devices, antennas, modems, and any other type of device configured to enable data communication via a communication network.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method of editing of data that comprises a metafile, the method comprising:
   selecting, by a processor of a computing device, said computing device comprising at least the processor and a memory, a first file comprised of data in a metafile, wherein the first file is stored in the memory accessible by the processor of the computing device, wherein selecting the first file comprises:
   generating, by the processor of the computing device, one or more folders in the memory for parsing the metafile;
   generating, by the processor of the computing device, an intermediate metafile comprised of the data in the metafile; and
   parsing, by the processor of the computing device, the intermediate metafile into one or more new metafiles and storing the one or more new metafiles in one of the one or more new folders, wherein parsing of the intermediate metafile continues until a root node of data that comprises the intermediate metafile is reached, wherein parsing of the intermediate file comprises:
   splitting metadata in the intermediate metafile into multiple chunks;
   identifying issues that affect the importation of data from the intermediate metafile into a spreadsheet, wherein at least one of the issues is that the data comprises denormalized data having a list of lists; and
   when the issues are identified that affect the importation of data from the intermediate metafile into a spreadsheet, splitting the denormalized, list of lists data metadata in the intermediate metafile until data is identified that can successfully be imported to the spreadsheet, and creating the one or more new metafiles comprising metadata that is importable to the spreadsheet;
   identifying, by the processor of the computing device, relationships among the data in the metafile, wherein identifying relationships among the data in the metafile further comprises:
   identifying relationships, by the processor of the computing device, between nodes of the intermediate metafile and storing the identified relationships in one or more new schema files in one of the one or more new folders, wherein each of the one or more new schema files corresponds to one of the one or more new metafiles, and populating the one or more new schema files with business rules; and
   building, by the processor of the computing device, an import map, wherein the import map maps relationships between the one or more new metafiles and corresponding sheets of the spreadsheet for each of the one or more new metafiles;
   transforming, by the processor of the computing device, the data in the metafile into data in a spreadsheet format, wherein the data in the metafile is transformed into multiple sheets of a spreadsheet workbook determined by the identified relationships among the data in the metafile, wherein transforming the data in the metafile into data in a spreadsheet format comprises:
   generating, by the processor of the computing device, the spreadsheet workbook; and
   importing, by the processor of the computing device, data from each of the one or more new metafiles into the spreadsheet workbook, wherein each of the one or more new metafiles is imported into corresponding separate sheets of the multiple sheets of the spreadsheet workbook, wherein the data from each of the one or more new metafiles is in the spreadsheet format after being imported into the spreadsheet;
   receiving edits, using the processor of the computing device, to the data in the spreadsheet format in the spreadsheet workbook; and
   transforming, by the processor of the computing device, the edited data in the spreadsheet format back to a file comprised of data in an output metafile.

2. The method of claim 1, wherein the metafile is comprised of data in an image exchange format (IEF) file.

3. The method of claim 2, wherein the IEF file comprises a digital imaging and communications in medicine (DICOM) protocol.

4. The method of claim 1, further comprising creating a schema file for the intermediate metafile, wherein each of the one or more schema files comprise a parent child relationship map, wherein the parent child relationship map identifies relationships between parent-child nodes.

5. The method of claim 4, wherein after transforming, by the processor of the computing device, the edited data in the spreadsheet format back to the file comprised of data in the output metafile, the data in the metafile is validated against data in one or more schema files used to create the metafile by the processor of the computing device.

6. The method of claim 1, wherein transforming, by the processor of the computing device, the edited data in the spreadsheet format back to a file comprised of data in the output metafile comprises transforming, by the processor of the computing device, the multiple sheets of the spreadsheet workbook into a single output metafile.

7. The method of claim 6, wherein the single output metafile comprises a single IEF file.

8. The method of claim 6, wherein the multiple sheets of the spreadsheet workbook are transformed by the computing device into a nested output metafile.

9. The method of claim 8, wherein the nested output metafile comprises a nested IEF file.

10. The method of claim 1, wherein selecting, by the computing device, a file comprised of data in the metafile format, wherein the file is stored in a memory accessible by the computing device, comprises selecting a file in the metafile format that is comprised of multiple pages.

11. The method of claim 1, wherein selecting, by the computing device, a file comprised of data in the metafile format, wherein the file is stored in a memory accessible by the computing device, comprises selecting a file in an image exchange format (IEF) that is comprised of nested XML data.

12. A system for editing data that comprises a metafile, the system comprising:
a computing device comprising at least a processor and a memory in communication with the processor, wherein the processor executes computer-executable instructions that cause the computing device to:
select a first file comprised of data in a metafile, wherein the first file is stored in the memory accessible by the processor of the computing device, wherein selecting the first file comprises:
generating, by the processor of the computing device, one or more folders in the memory for parsing the metafile;
generating, by the processor of the computing device, an intermediate metafile comprised of the data in the metafile; and
parsing, by the processor of the computing device, the intermediate metafile into one or more new metafiles and storing the one or more new metafiles in one of the one or more new folders, wherein parsing of the intermediate metafile continues until a root node of data that comprises the intermediate metafile is reached, wherein parsing of the intermediate file comprises:
splitting metadata in the intermediate metafile into multiple chunks;
identifying issues that affect the importation of data from the intermediate metafile into a spreadsheet, wherein at least one of the issues is that the data comprises denormalized data having a list of lists; and
when the issues are identified that affect the importation of data from the intermediate metafile into a spreadsheet, splitting the denormalized, list of lists data metadata in the intermediate metafile until data is identified that can successfully be imported to the spreadsheet, and creating the one or more new metafiles comprising metadata that is importable to the spreadsheet;
identify relationships among the data in the metafile, wherein identifying relationships among the data in the metafile further comprises:
identifying relationships, by the processor of the computing device, between nodes of the intermediate metafile and storing the identified relationships in one or more new schema files in one of the one or more new folders, wherein each of the one or more new schema files corresponds to one of the one or more new metafiles, and populating the one or more new schema files with business rules; and
building, by the processor of the computing device, an import map, wherein the import map maps relationships between the one or more new metafiles and corresponding sheets of the spreadsheet for each of the one or more new metafiles;
transform the data in the metafile into data in a spreadsheet format, wherein the data in the metafile is transformed into multiple sheets of a spreadsheet workbook determined by the identified relationships among the data in the metafile, wherein transforming the data in the metafile into data in a spreadsheet format comprises:
generating, by the processor of the computing device, the spreadsheet workbook; and
importing, by the processor of the computing device, data from each of the one or more new metafiles into the spreadsheet workbook, wherein each of the one or more new metafiles is imported into corresponding separate sheets of the multiple sheets of the spreadsheet workbook, wherein the data from each of the one or more new metafiles is in the spreadsheet format after being imported into the spreadsheet;
receive edits to the data in the spreadsheet format in the spreadsheet workbook; and
transform the edited data in the spreadsheet format back to a file comprised of data in an output metafile.

13. The system of claim 12, wherein the metafile is comprised of data in an image exchange format (IEF) file.

14. The system of claim 13, wherein the IEF file comprises a digital imaging and communications in medicine (DICOM) protocol.

15. The system of claim 12, further comprising creating a schema file for the intermediate metafile, wherein each of the one or more schema files comprise a parent child relationship map, wherein the parent child relationship map identifies relationships between parent-child nodes.

16. The system of claim 15, wherein after transforming, by the processor of the computing device, the edited data in the spreadsheet format back to the file comprised of data in the output metafile, the data in the metafile is validated against data in one or more schema files used to create the metafile by the processor of the computing device.

17. The system of claim 12, wherein transforming, by the processor of the computing device, the edited data in the spreadsheet format back to a file comprised of data in the output metafile comprises transforming, by the processor of the computing device, the multiple sheets of the spreadsheet workbook into a single output metafile.

18. The system of claim 17, wherein the single output metafile comprises a single IEF file.

19. The system of claim 18, wherein the single IEF file is in conformance with the DICOM protocol.

20. The system of claim 17, wherein the multiple sheets of the spreadsheet workbook are transformed by the computing device into a nested output metafile.

21. The system of claim 20, wherein the nested output metafile comprises a nested IEF file.

22. The system of claim 12, wherein selecting, by the computing device, a file comprised of data in the metafile format, wherein the file is stored in a memory accessible by the computing device, comprises selecting a file in the metafile format that is comprised of multiple pages.

23. The system of claim 12, wherein selecting, by the computing device, a file comprised of data in the metafile format, wherein the file is stored in a memory accessible by the computing device, comprises selecting a file in an image exchange format (IEF) that is comprised of nested XML data.

24. A non-transitory computer-readable medium comprising computer-executable instructions stored thereon that when executed by a computing device perform a method of editing of data that comprises a metafile, said method comprising:

selecting, by the computing device, a first file comprised of data in metafile, wherein the metafile is stored in a memory accessible by the computing device, wherein selecting the first file comprises:
  generating, by the computing device, one or more folders in the memory for parsing the metafile;
  generating, by the computing device, an intermediate metafile comprised of the data in the metafile; and
  parsing, by the computing device, the intermediate metafile into one or more new metafiles and storing the one or more new metafiles in one of the one or more new folders, wherein parsing of the intermediate metafile continues until a root node of data that comprises the intermediate metafile is reached, wherein parsing of the intermediate file comprises:
    splitting metadata in the intermediate metafile into multiple chunks;
    identifying issues that affect the importation of data from the intermediate metafile into a spreadsheet, wherein at least one of the issues is that the data comprises denormalized data having a list of lists; and
    when the issues are identified that affect the importation of data from the intermediate metafile into a spreadsheet, splitting the denormalized, list of lists data metadata in the intermediate metafile until data is identified that can successfully be imported to the spreadsheet, and creating the one or more new metafiles comprising metadata that is importable to the spreadsheet;

identifying, by the computing device, relationships among the data in the metafile, wherein identifying relationships among the data in the metafile further comprises:
  identifying relationships, by the computing device, between nodes of the intermediate metafile and storing the identified relationships in one or more new schema files in one of the one or more new folders, wherein each of the one or more new schema files corresponds to one of the one or more new metafiles, and populating the one or more new schema files with business rules; and
  building, by the computing device, an import map, wherein the import map maps relationships between the one or more new metafiles and corresponding sheets of the spreadsheet for each of the one or more new metafiles;

transforming, by the computing device, the data in the metafile into data in a spreadsheet format, wherein the data in the metafile is transformed into multiple sheets of a spreadsheet workbook determined by the identified relationships among the data in the metafile, wherein transforming the data in the metafile into data in a spreadsheet format comprises:
  generating, by the computing device, the spreadsheet workbook; and
  importing, by the computing device, data from each of the one or more new metafiles into the spreadsheet workbook, wherein each of the one or more new metafiles is imported into corresponding separate sheets of the multiple sheets of the spreadsheet workbook, wherein the data from each of the one or more new metafiles is in the spreadsheet format after being imported into the spreadsheet;

receiving edits, using the computing device, to the data in the spreadsheet format in the spreadsheet workbook; and transforming, by the computing device, the edited data in the spreadsheet format back to a file comprised of data in an output metafile.

25. The non-transitory computer-readable medium of claim 24, wherein the metafile is comprised of data in an image exchange format (IEF) file.

26. The non-transitory computer-readable medium of claim 25, wherein the IEF file comprises a digital imaging and communications in medicine (DICOM) protocol.

27. The non-transitory computer-readable medium of claim 24, further comprising creating a schema file for the intermediate metafile, wherein each of the one or more schema files comprise a parent child relationship map, wherein the parent child relationship map identifies relationships between parent-child nodes.

28. The non-transitory computer-readable medium of claim 27, wherein after transforming, by a processor of the computing device, the edited data in the spreadsheet format back to the file comprised of data in the output metafile, the data in the metafile is validated against data in one or more schema files used to create the metafile by the processor of the computing device.

29. The non-transitory computer-readable medium of claim 24, wherein transforming, by a processor of the computing device, the edited data in the spreadsheet format back to a file comprised of data in the output metafile comprises transforming, by the processor of the computing device, the multiple sheets of the spreadsheet workbook into a single output metafile.

30. The non-transitory computer-readable medium of claim 29, wherein the single output metafile comprises a single IEF file.

31. The non-transitory computer-readable medium of claim 30, wherein the single IEF file is in conformance with the DICOM protocol.

32. The non-transitory computer-readable medium of claim 29, wherein the multiple sheets of the spreadsheet workbook are transformed by the computing device into a nested output metafile.

33. The non-transitory computer-readable medium of claim 32, wherein the nested output metafile comprises a nested IEF file.

34. The non-transitory computer-readable medium of claim 24, wherein transforming, by the computing device, the edited data in the spreadsheet format back to the file comprised of data in the output metafile comprises transforming the edited data back to an image exchange format (IEF) file.

35. The non-transitory computer-readable medium of claim 24, wherein selecting, by the computing device, a file comprised of data in the metafile format, wherein the file is stored in a memory accessible by the computing device, comprises selecting a file in the metafile format that is comprised of multiple pages.

36. The non-transitory computer-readable medium of claim 24, wherein selecting, by the computing device, a file comprised of data in the metafile format, wherein the file is stored in a memory accessible by the computing device, comprises selecting a file in an image exchange format (IEF) that is comprised of nested XML data.

\* \* \* \* \*

UNITED STATES PATENT AND TRADEMARK OFFICE
CERTIFICATE OF CORRECTION

PATENT NO. : 10,984,184 B2  
APPLICATION NO. : 16/216504  
DATED : April 20, 2021  
INVENTOR(S) : Balasubramanian Natarajan et al.

Page 1 of 1

It is certified that error appears in the above-identified patent and that said Letters Patent is hereby corrected as shown below:

On the Title Page

Item (72), after the name of Inventor Balasubramanian Natarajan, should therefore be amended to include:
--Tim Hawn, Tulsa OK, (US); and Scott McCarty, Broken Arrow, OK, (US)--

Signed and Sealed this  
Twenty-eighth Day of November, 2023

Katherine Kelly Vidal  
*Director of the United States Patent and Trademark Office*